(12) United States Patent
Aronovich et al.

(10) Patent No.: US 8,244,938 B2
(45) Date of Patent: Aug. 14, 2012

(54) SLIDING WRITE WINDOW MECHANISM FOR WRITING DATA

(75) Inventors: Lior Aronovich, Toronto (CA); Amir Kredi, Tel Aviv (IL); Amit Schreiber, Kiriat Ata (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/952,446

(22) Filed: Nov. 23, 2010

(65) Prior Publication Data

US 2012/0131240 A1    May 24, 2012

(51) Int. Cl.
G06F 3/00    (2006.01)
G06F 5/00    (2006.01)

(52) U.S. Cl. ............................... 710/53; 710/56
(58) Field of Classification Search .................. None
See application file for complete search history.

(56) References Cited

U.S. PATENT DOCUMENTS

| | | | |
|---|---|---|---|
| 6,370,579 B1 | 4/2002 | Partridge | |
| 6,427,195 B1 | 7/2002 | McGowen et al. | |
| 6,735,647 B2 | 5/2004 | Boyd et al. | |
| 7,577,149 B1 | 8/2009 | Rahim et al. | |
| 7,779,021 B1 | 8/2010 | Smith et al. | |
| 2002/0161892 A1* | 10/2002 | Partridge | 709/226 |
| 2010/0046518 A1 | 2/2010 | Takagi et al. | |

* cited by examiner

Primary Examiner — Chun-Kuan Lee
Assistant Examiner — Ronald Modo
(74) Attorney, Agent, or Firm — Griffiths & Seaton PLLC

(57) ABSTRACT

Various embodiments writing data are provided. In one embodiment, the data arranged in a plurality of write intervals is loaded into a plurality of buffers, the totality of the plurality of buffers configured as a sliding write window mechanism adapted for movement to accommodate the write intervals. The data may reach the storage system out of a sequential order, and by loading it appropriately into the said buffers the data is ordered sequentially before it is written to the storage media. When a commencing section of the sliding write window is filled up with written data, this section is flushed to the storage media, and the window slides forward, to accommodate further data written by the writers. The writers are synchronized with the interval reflected by the current position of the sliding write window, and they send data to be written only where this data fits into the current interval of the window.

21 Claims, 6 Drawing Sheets

SLIDING WRITE WINDOW MECHANISM FOR WRITING DATA

BACKGROUND OF THE INVENTION

1. Field of the Invention

The present invention relates in general to computers, and more particularly to method, system, and computer program product embodiments in a computer environment using a processor device for writing data using a sliding write window mechanism.

2. Description of the Related Art

In enterprise data processing arrangements, such as may be used in a company, government agency or other entity, information is often stored on servers and accessed by users over, for example, a network. The information may comprise any type of information that of programs and/or data to be processed. Users, using their personal computers, workstations, or the like (generally, "computers") will enable their computers to retrieve information to be processed, and, in addition, to store information, for example, on remote servers.

Generally, servers store data in mass storage subsystems that typically include a number of disk storage units. Data is stored in units, such as files. In a server, a file may be stored on one disk storage unit, or alternatively portions of a file may be stored on several disk storage units. To provide redundancy and increase performance, many storage devices may be configured in a redundant array of independent disks (RAID) topology, where storage volumes are organized in RAID ranks. A computer network of a business may have multiple storage networks that are located remote from one another and a business user. The storage networks may also be hosted on different types of systems. To perform the job correctly, the business user may require fast and reliable access to the data contained in all of the storage networks. Since access to this data occurs in real time, it is desirable that storage operations (such as write or reads) occur as quickly as possible.

SUMMARY OF THE INVENTION

In view of the current state of the art, a need exists for a method of efficient writing of data into storage in a computer environment where writers (e.g. threads/processes) write sequential data to a storage system and the write operations may reach the storage system in an order different from their sequential order of generation. An example is a system where the writers send data to the storage system over a network, and network messages packing write operations may reach the storage system in an order different from their order of generation.

Accordingly, various embodiments for writing data are provided. In one embodiment, by way of example only, the data arranged in a plurality of write intervals is loaded into a plurality of buffers, the totality of the plurality of buffers configured as a sliding write window mechanism adapted for movement to accommodate the write intervals. The data may reach the storage system out of a sequential order, and by loading it appropriately into the said buffers the data is ordered sequentially before it is written to the storage media. When a commencing section of the sliding write window is filled up with written data, this section is flushed to the storage media, and the window slides forward, to accommodate further data written by the writers. The writers are synchronized with the interval reflected by the current position of the sliding write window, and they send data to be written only where this data fits into the current interval of the window.

In addition to the foregoing exemplary method embodiment, other exemplary system and computer product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
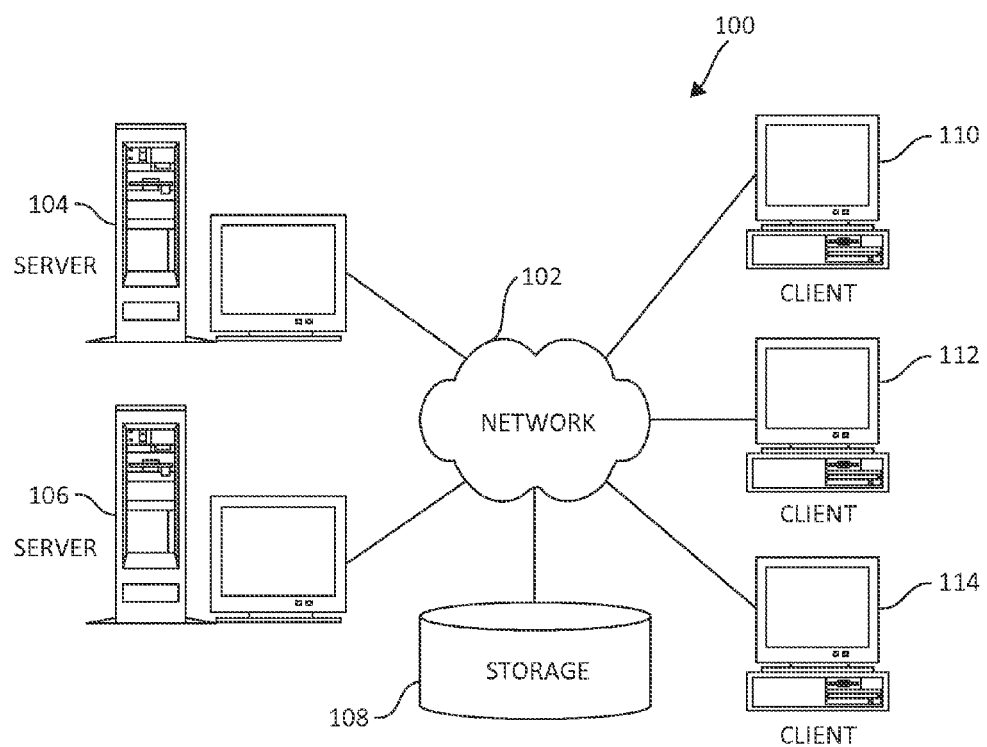
FIG. 1 is a block diagram illustration of an exemplary computing environment in which aspects of the present invention may be implemented.

Throughout the following description and claimed subject matter, the following terminology, pertaining to the illustrated embodiments, is described. A "writer", "writers", "single writer", or "single writers" is intended to refer to a thread or process that writes sequential data to the storage system by generating and issuing write intervals to the storage system.

A "write interval" is intended to refer to an interval of data from a data set being written sequentially by a writer to the storage system. A write interval is specified by its start offset and size in the sequential data set. While being generated in a sequential write sequence, write intervals do not intersect with each other. The size of the write intervals may differ between the write operations.

A "buffer interval" is intended to refer to being associated with a memory buffer in a sliding write window and represents the interval which the buffer covers in terms of the data set being written. A buffer interval is specified by its start offset and size in the sequential data set, and a buffer context. Once the buffer interval becomes filled with incoming data, it may be flushed to storage and its buffer context may be released and reused elsewhere. The boundaries of buffer intervals do not intersect and all such buffer intervals have the same size. Buffer intervals may intersect with write intervals.

A "chunk interval" is intended to refer to a section of a buffer interval and is specified by its start offset and size in terms of the data set being written. Chunk intervals may be used to perform some operations on the data stored in the memory buffers, before being flushed to storage. In present application, the system Cyclic Redundancy Check (CRC) is computed based on the incoming data and is done based on chunk intervals.

A "flusher" is intended to refer to a thread or process that collects memory buffers whose incoming data contents is complete, from the sliding write window, and flushes their contents to a storage media, storage device, storage environment, or storage medium. A single writer may be adapted to become a flusher to perform such functions of the flusher.

A "sliding write window" is intended to refer to holding a constant number of successive memory buffers each associated with a buffer interval. A sliding write window is therefore associated with an aggregated window interval, specified by its start offset, which is the lowest of the start offsets of its contained buffer intervals, and size, which is the total size of its contained buffers. Writers or single writers issue write operations associated with write intervals (issued possibly out of order), which fit entirely in the window interval. Write operations whose intervals do not entirely fit in the current window interval, may not be issued by the writers, until the window slides forward sufficiently. When one or several commencing and successive buffer intervals in the window fill up with incoming data, these buffers are processed to flush the buffer intervals contents to a storage media, storage device, storage environment, and/or storage medium. The sliding write window acquires empty buffers in accordance with the total size of the buffers that were flushed, and the sliding write window slides forward in accordance with the size of the flushed buffers (namely, its start offset is incremented by the size of the flushed buffers). The sliding write window advertises or communicates its boundaries to the writers, in order for the writers to compute permissible write operations.

The mechanisms of the illustrated embodiments provide for an efficient minimal mutual exclusion implementation of a sliding write window mechanism for writing data to a storage environment. The sliding write window, utilized by a storage system, is essentially a set of memory buffers, which are used to store incoming written data and order the incoming data appropriately before it is written to the storage. When a commencing section of the sliding write window is filled up with written data, the section is flushed to the storage, and the window slides forward to accommodate further data written by the writers. The writers are synchronized with the interval reflected by the current position of the sliding write window, and the writers send data to be written in the sliding write window only when the data fits into the current interval of the window.

The mechanisms of the illustrated embodiments relate to an implementation of a sliding write window, which efficiently minimizes mutual exclusion between writers accessing the window's mechanism and buffers to insert the writers' written data. Thus, minimizing mutual exclusion for accessing the sliding write window enables to significantly reduce the chance of having a bottleneck in the sliding write window mechanism and enables to increase overall system performance. The main functionality of a siding write window mechanism, in the context of a storage system, is ordering incoming written data from writers possibly over a network and allowing to flush large enough sequential intervals of data to storage. The mechanisms of the illustrated embodiments minimize mutual exclusion between concurrent writers issuing data to the sliding write window mechanism, thus significantly increasing performance of storage systems utilizing a sliding write window. In addition, the mechanisms of the illustrated embodiments facilitate efficient and concurrent calculations (e.g. of Cyclic Redundancy Check "CRC") based on chunk intervals, thus further increasing performance.

Figure 2A:
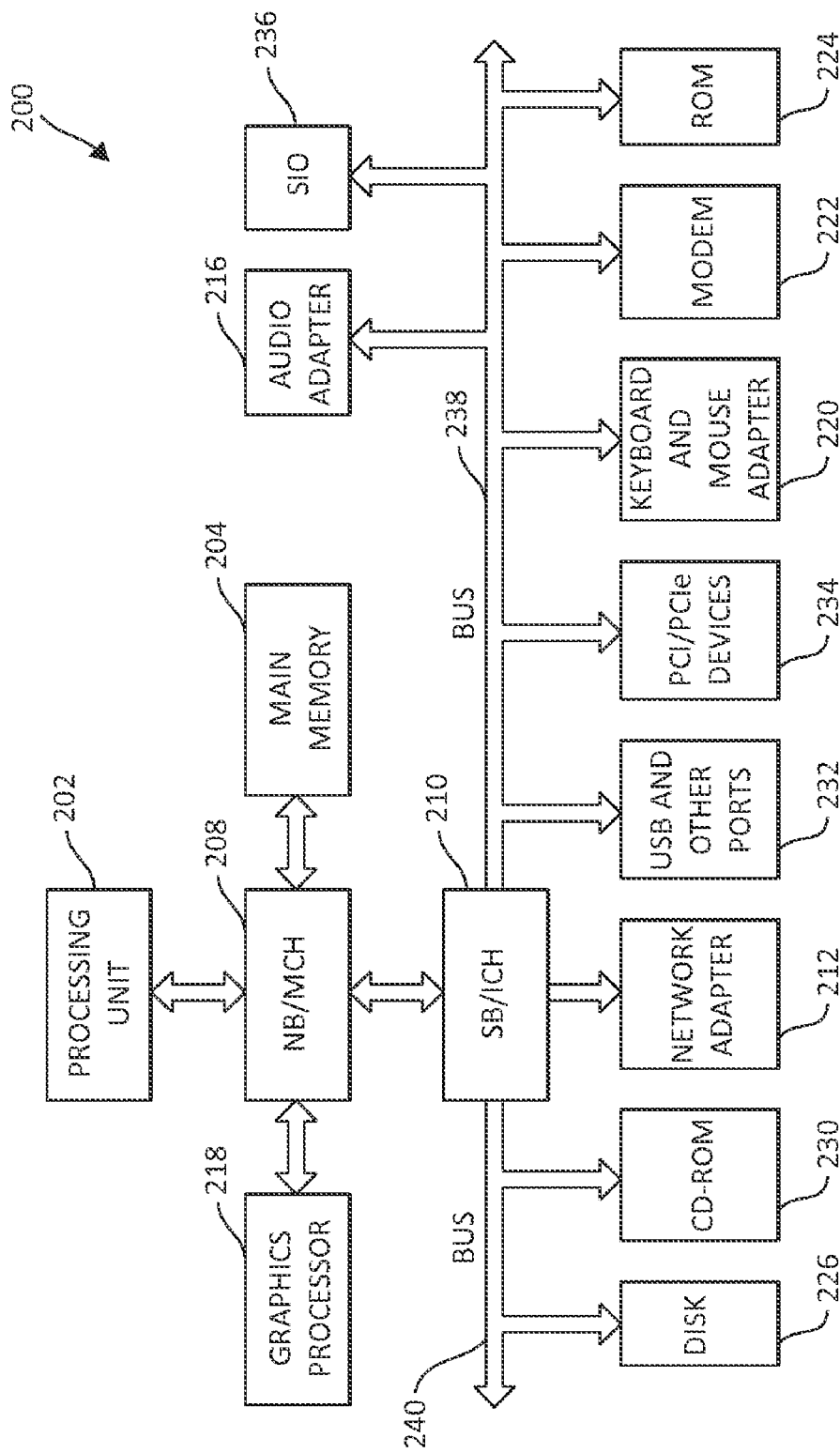
FIG. 2A is a block diagram illustration of an exemplary processing unit in a computing environment in which aspects of the present invention may be implemented.
Figure 2B:
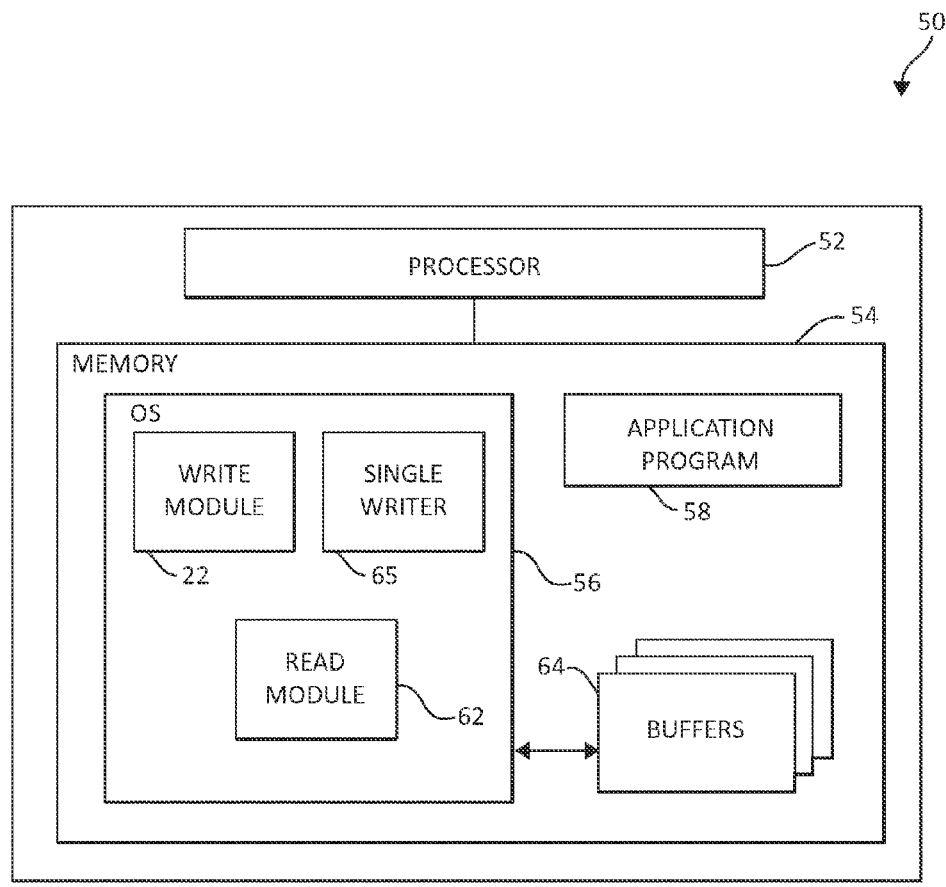
FIG. 2B is a block diagram illustration of an additional exemplary processing unit in an exemplary computing environment in which aspects of the present invention may be implemented.

Turning now to FIG. 1, a block diagram that illustrates an exemplary computing environment in which aspects of the present invention may be implemented is depicted. FIGS. 1, 2A and 2B are provided as exemplary diagrams of data processing environments in which embodiments of the present invention may be implemented. It should be appreciated that FIGS. 1, 2A, and 2B are only exemplary and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

FIG. 2A is a block diagram of that illustrates a portion 200 of an exemplary computing environment in which aspects of the present invention may be implemented. The data processing system 200 is an example of a computer, such as server 104 or client 108 in FIG. 1, in which computer usable code or instructions implementing the processes for embodiments of the present invention may be located.

In the depicted example, data processing system 200 employs a hub architecture including north bridge and memory controller hub (MCH) 208 and south bridge and input/output (I/O) controller hub (ICH) 210. Processing unit 202, main memory 204, and graphics processor 218 are connected to north bridge and memory controller hub 208. Graphics processor 218 may be connected to north bridge and memory controller hub 208 through an accelerated graphics port (AGP).

In the depicted example, local area network (LAN) adapter 212, audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 210 through bus 238. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 210 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 210.

An operating system runs on processing unit 202 and coordinates and provides control of various components within data processing system 200 in FIGS. 2A and 2B. As a client, the operating system may be a commercially available operating system known to one of ordinary skill in the art. As a server, data processing system 200 may be, for example, an IBM® eServer™ pSeries® computer system, running the Advanced Interactive Executive (AIX®) operating system or LINUX operating system. Data processing system 200 may be a symmetric multiprocessor (SMP) system including a plurality of processors in processing unit 202.

Alternatively, a single processor system may be employed. Instructions for the operating system, the object-oriented programming system, and applications or programs are located on storage devices, such as hard disk drive 226, and may be loaded into main memory 204 for execution by processing unit 202. The processes for embodiments of the present invention are performed by processing unit 202 using computer usable program code, which may be located in a memory such as, for example, main memory 204, read only memory 224, or in one or more peripheral devices 226 and 230.

Those of ordinary skill in the art will appreciate that the hardware in FIGS. 1, 2A, and 2B may vary depending on the implementation. Other internal hardware or peripheral devices, such as flash memory, equivalent nonvolatile memory, or optical disk drives and the like, may be used in addition to or in place of the hardware depicted in FIGS. 1, 2A, and 2B. Also, the processes of the present invention may be applied to a multiprocessor data processing system. As some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2A. A memory may be, for example, main memory 204, read only memory 224, or a cache such as found in north bridge and memory controller hub 208 in FIG. 2. The depicted examples in FIGS. 1, 2A, and 2B and above-described examples are not meant to imply architectural limitations. For example, data processing system 200 also may be a tablet computer, laptop computer, or telephone device in addition to taking the form of a PDA.

Turning now to FIG. 2B, a block diagram illustration of a portion 50 of an exemplary computing environment in which aspects of the present invention may be implemented. In the illustrated embodiment, portion 50 includes a processor 52 and a memory 54, such as random access memory (RAM). Portion 50 may be operatively coupled to several components not illustrated for purposes of convenience, including, but not limited to, a display, which presents images such as windows to the user on a graphical user interface, a keyboard, mouse, printer, and the like. Of course, those skilled in the art will recognize that any combination of the above components, or any number of different components, peripherals, and other devices, may be used with FIG. 2B.

In the illustrated embodiment, the FIG. 2B operates under control of an operating system (OS) 56 (e.g. AIX, z/OS, OS/2 LINUX, UNIX, WINDOWS, MAC OS) stored in the memory 54, and interfaces with the user to accept inputs and commands and to present results. In one embodiment of the present invention, the OS 56 facilitates functionality according to the present invention. To this end, OS 56 includes a write module 22 and a read module 62, which may be adapted for carrying out various processes and mechanisms in the exemplary methods described.

The write module 22, read module 62, and single writer 65, may perform the commands to read and write the data being sent from the network and read and write the threads or processes that writes sequential data to the storage system by generating and issuing to the storage system write intervals. The write module 22, read module 62, and single writer 65 may be configured and designed so that as a sliding write window 304 (FIG. 3, following) stores incoming written data in the buffers 64 of the sliding write window 304, and when one or more commencing and successive buffers 64 in the sliding write window 304 (e.g., a sequence of buffers starting from the first buffer 64 in the sliding write window 304) are filled completely with data, the sliding write window 304 conveys this information to the single writer 65, which then assumes a role of a flusher, as will also be described in FIG. 3. Buffers 64 may also be adapted for carrying out various processes and mechanism in the exemplary methods described. The buffers 64 may be used to store incoming written data and write intervals and order the incoming data appropriately before it is written to the storage media or storage environment, and functionality will be described in FIG. 3, following.

In one embodiment, instructions implementing the operating system 56, the write module 22, the read module, the single writer 65, and the buffers 64 are tangibly embodied in a computer-readable medium, which may include one or more fixed or removable data storage devices, such as a zip drive, disk, hard drive, DVD/CD-ROM, digital tape, solid state drives (SSDs), etc. Further, the operating system 56, the write module 22, the read module, and the buffers 64 comprise instructions which, when read and executed by the computing storage environment to perform the steps necessary to implement and/or use the present invention. The operating system 56, the write module 22, the read module, the single writer 65, and the buffers 64 may also be tangibly embodied in the memory 54 and/or transmitted through or accessed by networks as described in FIG. 1 via various components. As such, the terms "article of manufacture," "program storage device" and "computer program product" as may be used herein are intended to encompass a computer program accessible and/or operable from any computer readable device or media.

The mechanisms for the illustrated embodiments may include one or more associated software application programs 58 that include, for example, functions for managing a distributed computer system comprising a network of computing devices, such as a SAN or NAS as previously described. Accordingly, processor 52 may comprise one or more storage management processors (SMP). The application program 58 may operate within a single computer or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those of ordinary skill in the art.

Figure 3:
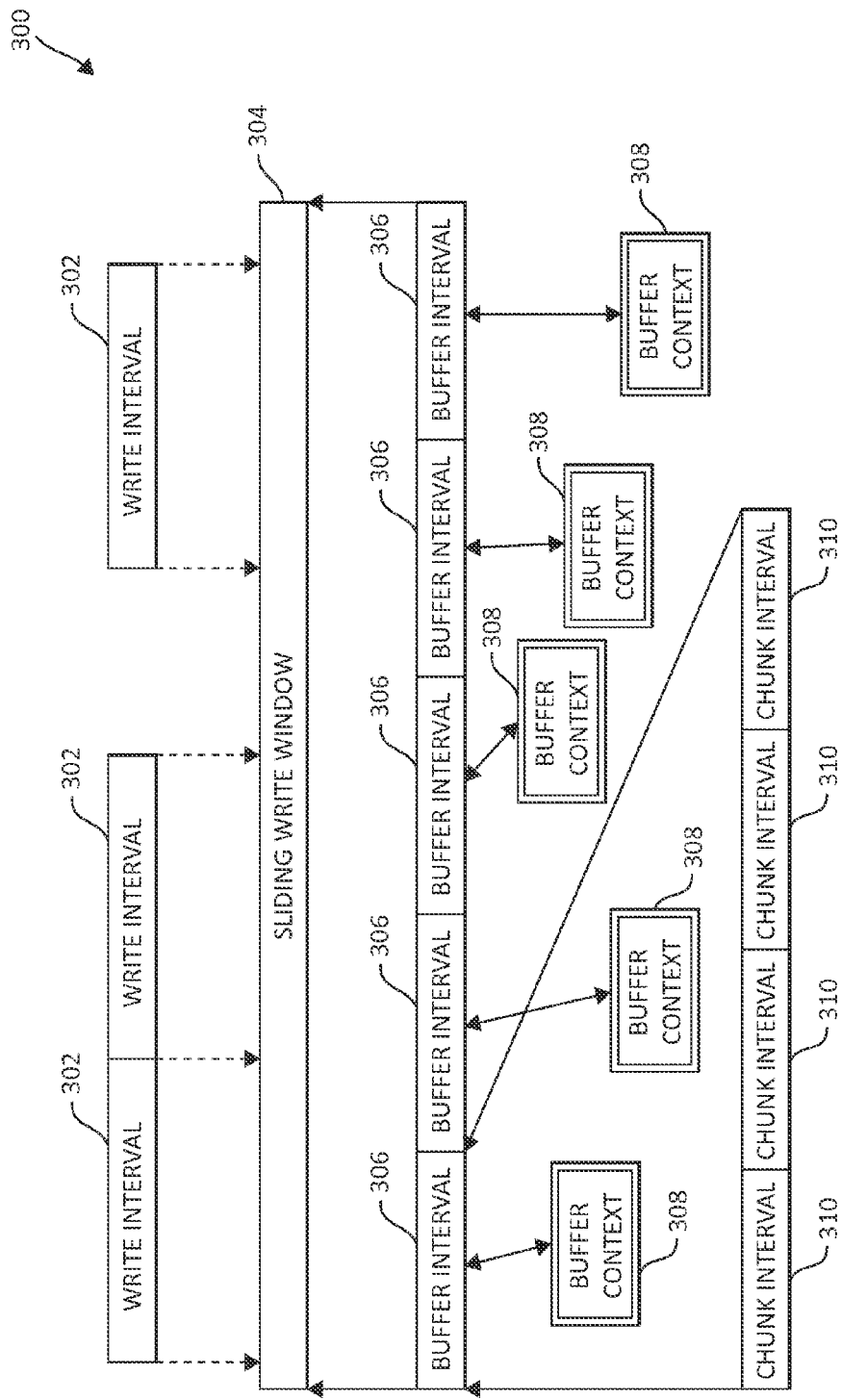
FIG. 3 is a block diagram illustration of an exemplary sliding write window mechanism in a storage system.

FIG. 3 is a block diagram of exemplary sliding write window functionality 300 incorporating various aspects of the illustrated embodiments. A sliding write window 304 stores incoming written data in the form of write intervals 302 into buffers 64 (FIG. 2B), which are associated with the buffer intervals 306. As previously indicated, buffer intervals are specified by their start offset and size in the sequential data set and buffer context. Accordingly, each buffer interval 306 is specified, in part, by a buffer context 308 as shown. Again, as previously indicated, a chunk interval is a section of a buffer interval and is specified by its start offset and size in terms of the data set being written. Chunk intervals 310 are sections of each buffer interval 306 (shown as an example for a single buffer interval).

When one or more commencing and successive buffers 64, (i.e. a sequence of buffers starting from the first buffer in the window) are filled up with data, the sliding write window 304 conveys this information to a single writer (FIG. 2B, 22), which then assumes the role of a flusher. The flusher enters an critical section in which the flusher collects as many complete buffers 64 as available, inserts references to these buffers 64 or buffer intervals, in the buffers' 64 appropriate order, into a flushing queue, and ends the critical section.

The flusher then takes the buffer 64 references from the flushing queue (in the buffers' 64 order), and flushes the contents of the referenced buffers 64 to the storage media or storage medium. Then, the flusher acquires empty buffers 64, enters a critical section, and adds these buffers 64 to the sliding write window 304. Mutual exclusion is applied between operations of adding and removing of buffers 64 in and out of the sliding write window, and operations that compute the location in the sliding write window 304 to write incoming data and then indicate the level in which the sliding write window 304 and the buffers 64 comprising the sliding write window are filled. Thus, mutual exclusion is minimized such that only fast memory operations are performed within the critical section. The mechanisms of the present invention enable a removal of bottlenecks in a sliding write window mechanism 304 and increase the overall performance of a storage system.

Figure 4A:
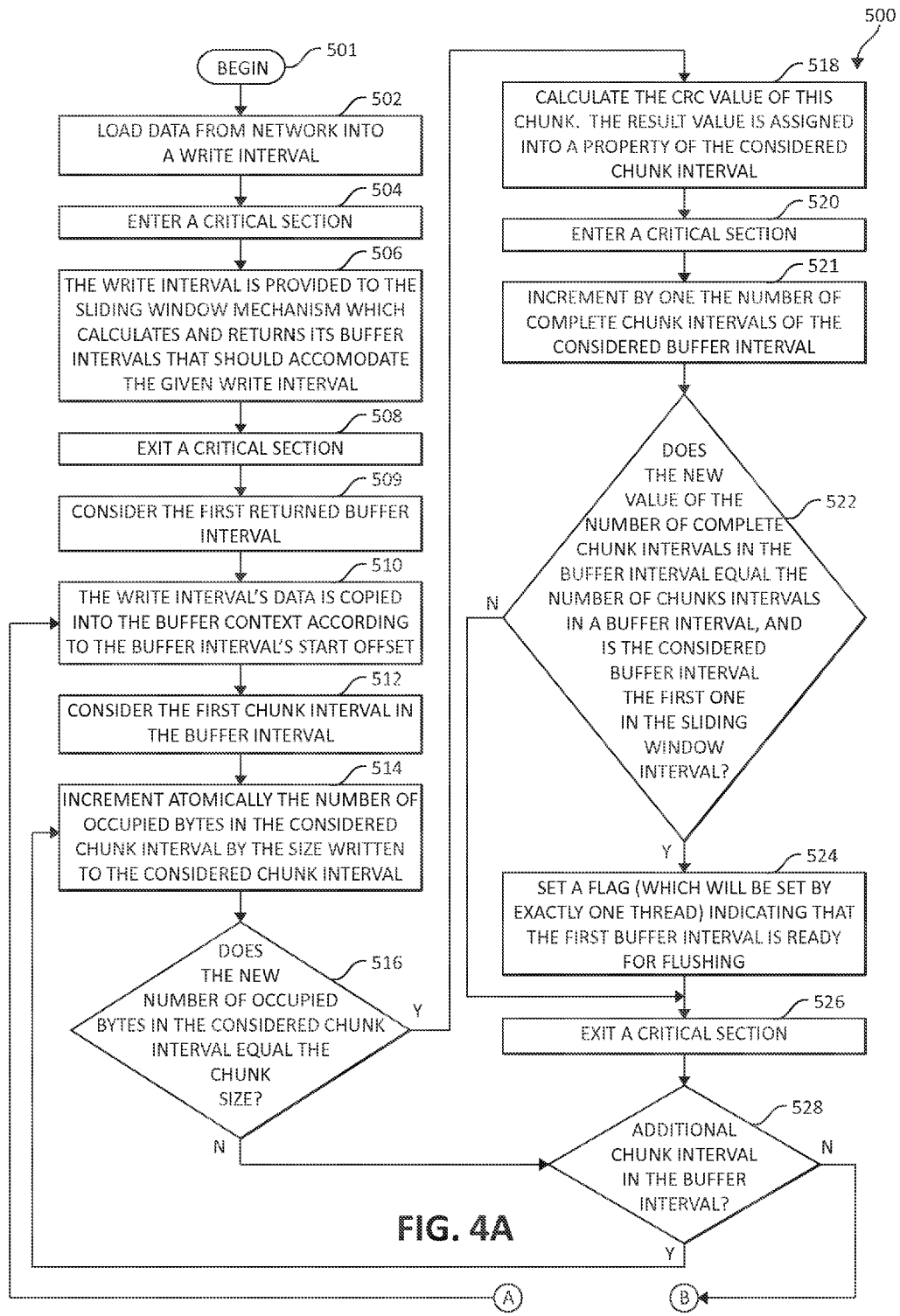
FIGS. 4A and 4B are flow chart illustrations of an exemplary method for writing data using a sliding write window mechanism in a storage system.
Figure 4B:
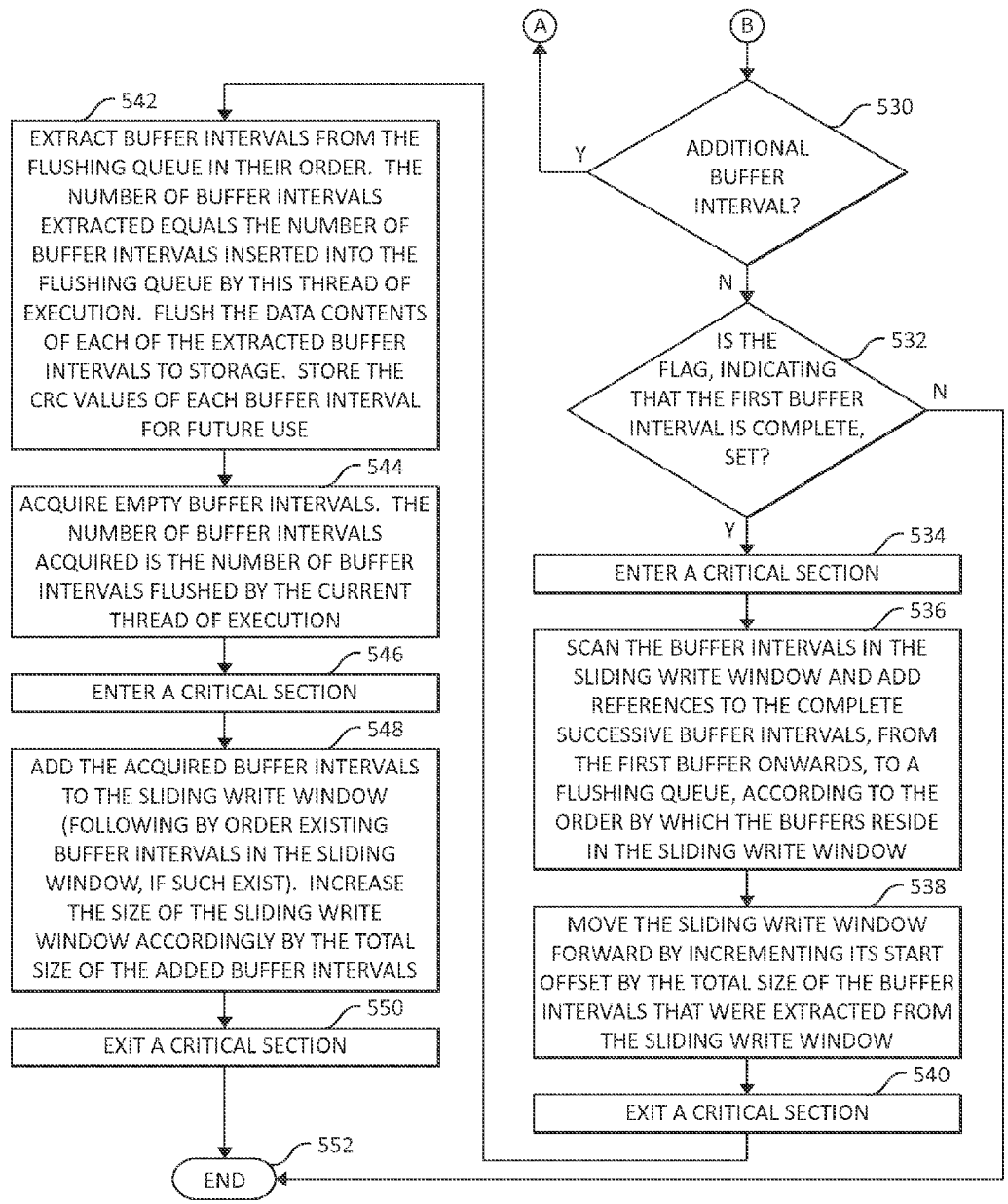

Turning now to FIGS. 4A and 4B, a flow chart illustrating an exemplary method 500 for writing data as an efficient minimal mutual exclusion implementation of a sliding write window mechanism is presented. The method 500 commences (step 501) and data is loaded from the network into write intervals (step 502). The method enters a critical section 504. The method (step 506) provides a write interval to the sliding window mechanism, which calculates and returns its buffer intervals that should accommodate the given write interval and then exits the critical section (step 508). The method (step 509) will then consider the first returned buffer interval. The write interval's data will be copied into the buffer context according to the buffer interval's start offset (step 510). Next, the method (step 512) will consider the first chunk interval in the buffer interval. The method (step 514) will increment atomically the number of occupied bytes in the considered chunk interval by the size written to the considered chunk interval. The method (step 516) determines if the new number of occupied bytes in the considered chunk interval equals the chunk size. If the new number of occupied bytes in the considered chunk interval does not equal the chunk size, the method (step 528) checks for additional chunk intervals in the buffer. If there are additional chunk intervals in the buffer, the method (step 528) cycles back and increments atomically the number of occupied bytes in the considered chunk interval by the size written to the considered chunk interval (step 514). If the new number of occupied bytes in the considered chunk interval equals the chunk size (step 516), the method (step 518) calculates the CRC value of the chunk and assigns the calculated value into a property of the considered chunk interval.

Once again, the method (step 520) enters a critical section. In the critical section (step 520), the method (step 521) increments by one the number of complete chunk intervals of the considered buffer interval. The method (step 522) determines if the new value of the number of complete chunk intervals in the buffer interval equals the number of chunk intervals in a buffer interval and if the considered buffer interval is the first one in the sliding write window interval. If the condition in step 522 does not apply, the method (step 526) exits the critical section. If the condition in step 522 applies, the method (step 524) will set a flag, which will be set by exactly one thread, indicating that the first buffer interval is ready and prepared for flushing and then the critical section exits (step 526). Next, the method (step 528) determines if there are additional chunk intervals in the buffer intervals, as previously mentioned. If there are additional chunk intervals in the buffer interval, the method (step 528) cycles back and increments atomically the number of occupied bytes in the considered chunk interval by the size written to the considered chunk interval (step 514). If there are no additional chunk intervals in the buffer interval, the method determines if there is an additional buffer interval (step 530). If there is an additional buffer interval the write interval's data will be copied into the buffer context according to the buffer intervals start offset (step 510). If there is no additional buffer interval (step 530), the method (532) determines if a flag is set indicating that the first buffer interval is complete and if not the method (532) ends.

When the flag is set (step 532), the method enters a critical section (step 534). The buffer intervals are scanned (step 536) in the sliding write window and references are added to the complete successive buffer intervals, from the first buffer onwards to a flushing queue based upon the order of residency within the sliding write window. The sliding write window is moved forward by incrementing the start offset by the total size of the buffer intervals that were extracted from the sliding write window (step 538). The method exits the critical section (step 540). Buffer intervals are extracted (step 542) from the flushing queue based on the buffer intervals order. The number of buffer intervals extracted equals the number of buffer intervals inserted into the flushing queue by the current thread of execution (step 542). New empty buffer intervals are acquired (step 544). The number of buffer intervals acquired is the number of buffer intervals flushed by the current thread of execution. The method enters a critical section (step 546) and the acquired buffer intervals are added to the sliding write window. If any buffer intervals exist within the sliding write window, the acquired buffer intervals are placed in order following the existing buffer intervals. The size of the sliding write window is increased accordingly by the total size of the added buffer intervals. The method exists the critical section (step 550) and the method ends (step 552).

In one aspect of the illustrated embodiments, the single writer enters a critical section, and provides to the sliding write window the single writer's write interval and the sliding write window calculates and returns buffer intervals that will accommodate the given write interval. The high-speed calculation performed by the sliding write window for returning buffer intervals is done inside the critical section since the sliding write window may be rolled forward in parallel. The critical section is then exited.

For each of the returned buffer intervals, the mechanisms of the illustrated embodiments may perform operations outside a critical section. The single writer writes or copies the single writer's write interval's data into the buffer context according to the buffers interval start offset. Because data copying is a lengthier operation it is performed outside a critical section. The single writer informs the sliding write window of the completion of the writing of the single writer's write interval into the given buffer interval of the sliding write window. The single writer iterates over the chunk intervals inside the buffer interval, and for each chunk interval, the value of the number of occupied bytes by the written size to this chunk interval is atomically updated (this value is initialized to zero beforehand). An atomic operation is implemented with instant locking for the duration of the specific operation. If the new value reaches the constant chunk size, then the Cyclic Redundancy Check "CRC" value of this chunk is calculated. This is a lengthier operation that is done outside a critical section. The result of the calculation is set into a property of the relevant chunk interval.

Having performed several operations outside the critical section, the mechanisms of the illustrated embodiments may reestablish or reenter a critical section. The number of complete chunk intervals of the relevant buffer interval is now incremented by a factor of one. If the new value of the number of complete chunk intervals reaches the constant number of chunks intervals in a buffer interval, and if the associated buffer interval is the first one in the current sliding window, then the operation will set a flag, provided to the single writer, indicating that the first buffer interval is ready for flushing. Exactly one single writer will receive the indication of the first buffer interval being ready for flushing since the write intervals do not intersect. Then the critical section is exited.

Having processed all of the buffer intervals that were provided by the sliding write window mechanism, the single writer then checks if the flag indicating that the first buffer interval is complete is set, and is so then the single writer continues and assumes the role of a flusher, once again entering a critical section. The flusher scans the buffer intervals in the sliding write window and adds references to the successive buffer intervals, starting from the first buffer, which are complete (i.e. all their chunk intervals are complete), to a flushing queue, in the order by which the buffers reside in the sliding write window. There will be at least one complete buffer interval at this point in the process.

Next, the sliding write window is moved forward by incrementing its start offset by the total size of the buffer intervals that were extracted from the sliding write window. The size of the sliding write window is reduced at this stage because there has not been an acquisition of any new buffers. The critical section is then exited.

Outside a critical section, buffer intervals are extracted from the flushing queue. The number of buffer intervals extracted by the current thread of execution equals the number of buffer intervals which were inserted into the flushing queue by the current thread of execution. The buffer intervals are extracted from the flushing queue in the order by which they were placed in the queue. Also, for each of the number of buffer intervals, the buffer intervals content may be flushed to a storage media and the CRC values of their chunks are stored (for future verifications of read operations). While still outside of a critical section empty buffer intervals are acquired. The number of buffer intervals acquired is the number of buffers flushed by the current thread of execution.

Once again, the mechanisms of the illustrated embodiments may reenter a critical section. The acquired empty buffer intervals are added to the sliding write window, placed following any existing buffers in the window. The size of the sliding write window is increased accordingly. The critical section is then exited.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for writing data using a processor device, comprising:
   loading the data arranged in a plurality of write intervals into a plurality of buffers, the totality of the plurality of buffers configured as a sliding write window mechanism adapted for movement to accommodate the plurality of write intervals, wherein the data may reach the plurality of buffers out of a sequential order, yet is ordered sequentially into the plurality of buffers in the sliding write window mechanism;
   conveying the data in the sliding write window mechanism to a single writer upon filling the data in at least one of the plurality of buffers stored in a sequence in the sliding write window mechanism, the single writer adapted to assume a functional role as a flushing mechanism by using reference information to flush sequential intervals of the data from the sliding write window mechanism to a storage environment; and
   applying mutual exclusion within the sliding write window mechanism, via critical sections, only between operations that change a structure of the sliding write window, including operations for removal and addition of buffers, and operations that compute a location in the sliding write window mechanism for writing incoming data.

2. The method of claim 1, wherein the single writer and the sliding write window mechanism enter one of the critical sections by performing at least one of:
   providing the plurality of write intervals to the sliding write window mechanism, wherein the sliding write widow mechanism calculates and returns a plurality of buffer intervals to accommodate the plurality of write intervals, the plurality of buffer intervals corresponding to the plurality of buffers,
   incrementing a number of a plurality of complete chunk intervals of a relevant one of the plurality of buffer intervals by a factor of one, and
   performing one of adding and removing at least one of the plurality of buffer intervals to the sliding write window mechanism, wherein the addition of an empty one of the plurality of buffer intervals may follow an existing one of the plurality of buffer intervals in a sequential order, a size of the sliding write window mechanism increasing when adding and decreasing when removing one of the plurality of buffer intervals.

3. The method of claim 2, wherein if a new value of the plurality of complete chunk intervals reaches a constant number in one of the plurality of buffer intervals, and one of the plurality of buffer intervals is first in the sliding write window mechanism, setting a flag, provided to the single writer, indicating a first buffer interval is ready for flushing.

4. The method of claim 3, further including, wherein if the flag indicating the first buffer interval is compete, performing, by the single writer, at least one of:
   scanning the plurality of buffer intervals in the sliding write window mechanism,
   adding a plurality of references to a next successive one of the plurality of buffer intervals commencing at a first one of the plurality of buffer intervals in which all of the plurality of chunk intervals are complete,
   placing in a flushing queue the plurality of buffer intervals in an appropriate order based upon an order in which the plurality of buffer intervals reside in the sliding write window mechanism, and
   moving the sliding write window mechanism forward by incrementing a start offset by a size of the one of the plurality of buffer intervals that were removed from the sliding write window mechanism.

5. The method of claim 1, further including, for each of a returned one of a plurality of buffer intervals obtained during one of the critical sections, performing outside the one of the critical sections at least one of:
   copying data from the plurality of write intervals into a buffer context based upon a start offset of the plurality of the buffers,
   informing, by the single writer, the sliding write window mechanism of a completion of a writing of the plurality of write intervals into one of the plurality of buffer intervals,
   iterating, by the single writer, over a plurality of chunk intervals inside the plurality of buffer intervals, wherein for each of the plurality of chunk intervals, implementing an atomic operation with instant locking for a duration of a specific operation, the value of the number of occupied bytes by a written size to the plurality of chunk intervals is atomically updated and the value is initialized at zero, flushing from a flushing queue the number of the plurality of buffer intervals placed into the flushing queue by a current thread of execution in the order of placement into the flushing queue, wherein the plurality of buffer intervals content is flushed to the storage environment and the cyclic redundancy check (CRC) is computed based upon incoming data based upon the plurality of chunk intervals, and acquiring the plurality of buffer intervals emptied from flushing, the number of the plurality of buffer intervals acquired being a number of the plurality of buffers flushed by a current thread of execution.

6. The method of claim 1, further including, synchronizing the single writer with the plurality of write intervals reflected by a current position of the sliding write window mechanism, wherein the single writer sends the data to be written to the sliding write window mechanism when the data fits into a current interval of the sliding write window mechanism.

7. A system for writing data in a computer environment, comprising:
at least one processor device operable in a computer environment, wherein the at least one processor device is adapted for:
loading the data arranged in a plurality of write intervals into a plurality of buffers, the totality of the plurality of buffers configured as a sliding write window mechanism adapted for movement to accommodate the write intervals, wherein the data may reach the plurality of buffers out of a sequential order, yet is ordered sequentially into the plurality of buffers in the sliding write window mechanism,
conveying the data in the sliding write window mechanism to a single writer upon filling the data in at least one of the plurality of buffers stored in a sequence in the sliding write window mechanism, the single writer adapted to assume a functional role as a flushing mechanism by using reference information to flush sequential intervals of the data from the sliding write window mechanism to a storage environment, and
applying mutual exclusion within the sliding write window mechanism, via critical sections, only between operations that change a structure of the sliding write window, including operations for removal and addition of buffers, and operations that compute a location in the sliding write window mechanism for writing incoming data.

8. The system of claim 7, wherein the at least one processor device is further adapted for facilitating the single writer and the sliding write window mechanism entering one of the critical sections by performing at least one of:
providing a plurality of write intervals to the sliding write window mechanism, wherein the sliding write widow mechanism calculates and returns a plurality of buffer intervals to accommodate the plurality of write intervals,
incrementing a number of a plurality of complete chunk intervals of a relevant one of the plurality of buffer intervals by a factor of one, and
performing one of adding and removing at least one of the plurality of buffer intervals to the sliding write window mechanism, wherein the addition of an empty one of the plurality of buffer intervals may follow an existing one of the plurality of buffer intervals in a sequential order, a size of the sliding write window mechanism increasing when adding and decreasing when removing one of the plurality of buffer intervals.

9. The system of claim 8, wherein the at least one processor device is further adapted for, if a new value of the plurality of complete chunk intervals reaches a constant number in one of the plurality of buffer intervals, and one of the plurality of buffer intervals is first in the sliding write window mechanism, setting a flag, provided to the single writer, indicating a first buffer interval is ready for flushing.

10. The system of claim 9, wherein the at least one processor device is further adapted for, if the flag indicating the first buffer interval is compete, performing, by the single writer, at least one of:
scanning the plurality of buffer intervals in the sliding write window mechanism,
adding a plurality of references to a next successive one of the plurality of buffer intervals commencing at a first one of the plurality of buffer intervals in which all of the plurality of chunk intervals are complete,
placing in a flushing queue the plurality of buffer intervals in an appropriate order based upon an order in which the plurality of buffer intervals reside in the sliding write window mechanism, and
moving the sliding write window mechanism forward by incrementing a start offset by a size of the one of the plurality of buffer intervals that were removed from the sliding write window mechanism.

11. The system of claim 7, wherein the at least one processor device is further adapted for, for each of a returned one of a plurality of buffer intervals obtained during one of the critical sections, performing outside the one of the critical sections at least one of:
copying data from the plurality of write intervals into a buffer context based upon a start offset of the plurality of the buffers,
informing, by the single writer, the sliding write window mechanism of a completion of a writing of the plurality of write intervals into one of the plurality of buffer intervals,
iterating, by the single writer, over a plurality of chunk intervals inside the plurality of buffer intervals, wherein for each of the plurality of chunk intervals, implementing an atomic operation with instant locking for a duration of a specific operation, the value of the number of occupied bytes by a written size to the plurality of chunk intervals atomically updated and initialized at zero,
flushing from a flushing queue the number of the plurality of buffer intervals placed into the flushing queue by a current thread of execution in the order of placement into the flushing queue, wherein the plurality of buffer intervals content is flushed to the storage environment and the cyclic redundancy check (CRC) is computed based upon incoming data based upon the plurality of chunk intervals, and
acquiring the plurality of buffer intervals emptied from flushing, the number of the plurality of buffer intervals acquired equal to a number of the plurality of buffers flushed by the current thread of execution.

12. The system of claim 7, wherein the at least one processor device is further adapted for synchronizing the single writer with the plurality of write intervals reflected by a current position of the sliding write window mechanism, wherein the single writer sends the data to be written to the sliding write window mechanism when the data fits into a current interval of the sliding write window mechanism.

13. A computer program product writing data in a computer environment using a processor device, the computer program product comprising a non-transitory computer-readable storage medium having computer-readable program code portions stored therein, the computer-readable program code portions comprising:

a first executable portion for loading the data arranged in a plurality of write intervals into a plurality of buffers, the totality of the plurality of buffers configured as a sliding write window mechanism adapted for movement to accommodate the write intervals, wherein the data may reach the plurality of buffers out of a sequential order, yet is ordered sequentially into the plurality of buffers in the sliding write window mechanism;

a second executable portion for conveying the data in the sliding write window mechanism to a single writer upon the filling of the data in at least one of the plurality of buffers stored in a sequence in the sliding write window mechanism, the single writer adapted to assume a functional role as a flushing mechanism by using reference information to flush sequential intervals of the data from the sliding write window mechanism to a storage environment; and third executable portion for applying mutual exclusion within the sliding write window mechanism, via critical sections, only between operations that change a structure of the sliding write window, including operations for removal and addition of buffers, and operations that compute a location in the sliding write window mechanism for writing incoming data.

14. The computer program product of claim 13, further including a fourth executable portion for facilitating the single writer and the sliding write window mechanism entering one of the critical sections by performing at least one of:

providing the plurality of write intervals to the sliding write window mechanism, wherein the sliding write widow mechanism calculates and returns a plurality of buffer intervals to accommodate the plurality of write intervals, incrementing a number of a plurality of complete chunk intervals of a relevant one of the plurality of buffer intervals by a factor of one, and performing one of adding and removing at least one of the plurality of buffer intervals to the sliding write window mechanism, wherein the addition of an empty one of the plurality of buffer intervals may follow an existing one of the plurality of buffer intervals in a sequential order, a size of the sliding write window mechanism increasing when adding and decreasing when removing one of the plurality of buffer intervals.

15. The computer program product of claim 14, further including a fifth executable portion for, if a new value of the plurality of complete chunk intervals reaches a constant number in one of the plurality of buffer intervals, and one of the plurality of buffer intervals is first in the sliding write window mechanism, setting a flag, provided to the single writer, indicating a first buffer interval is ready for flushing.

16. The computer program product of claim 15, further including a sixth executable portion for, if the flag indicating the first buffer interval is compete, performing, by the single writer, at least one of:

scanning the plurality of buffer intervals in the sliding write window mechanism, adding a plurality of references to a next successive one of the plurality of buffer intervals commencing at a first one of the plurality of buffer intervals in which all of the plurality of chunk intervals are complete, placing in a flushing queue the plurality of buffer intervals in an appropriate order based upon an order in which the plurality of buffer intervals reside in the sliding write window mechanism, and moving the sliding write window mechanism forward by incrementing a start offset by a size of the one of the plurality of buffer intervals that were removed from the sliding write window mechanism.

17. The computer program product of claim 13, further including a fourth executable portion for, for each of a returned one of a plurality of buffer intervals obtained during one of the critical sections, performing outside the one of the critical sections at least one of:

copying the data from the plurality of write intervals into a buffer context based upon a start offset of the plurality of the buffers, informing, by the single writer, the sliding write window mechanism of a completion of a writing of the plurality of write intervals into one of the plurality of buffer intervals, iterating, by the single writer, over a plurality of chunk intervals inside the plurality of buffer intervals, wherein for each of the plurality of chunk intervals, implementing an atomic operation with instant locking for a duration of a specific operation, the value of the number of occupied bytes by a written size to the plurality of chunk intervals atomically updated and initialized at zero, flushing from a flushing queue the number of the plurality of buffer intervals placed into the flushing queue by a current thread of execution in the order of placement into the flushing queue, wherein the plurality of buffer intervals content is flushed to the storage environment and the cyclic redundancy check (CRC) is computed based upon incoming data based upon the plurality of chunk intervals, and acquiring the plurality of buffer intervals emptied from flushing, the number of the plurality of buffer intervals acquired equal to a number of the plurality of buffers flushe30 by the current thread of execution.

18. The computer program product of claim 13, further including a fourth executable portion for synchronizing the single writer with the plurality of write intervals reflected by a current position of the sliding write window mechanism, wherein the single writer sends the data to be written to the sliding write window mechanism when the data fits into a current interval of the sliding write window mechanism.

19. The method of claim 1, further including reducing the size of the sliding write window mechanism if none of the plurality of buffers are acquired after moving the sliding write window mechanism forward.

20. The system of claim 7, wherein the at least one processor device is further adapted for reducing the size of the sliding write window mechanism if none of the plurality of buffers are acquired after moving the sliding write window mechanism forward.

21. The computer program product of claim 13, further including a fourth executable portion for reducing the size of the sliding write window mechanism if none of the plurality of buffers are acquired after moving the sliding write window mechanism forward.

* * * * *